United States Patent
Lauka et al.

(10) Patent No.: US 9,818,083 B1
(45) Date of Patent: *Nov. 14, 2017

(54) ASSOCIATION OF ITEM IDENTIFIERS

(71) Applicant: Amazon Technologies, Inc., Seattle, WA (US)

(72) Inventors: Wesley Scott Lauka, Seattle, WA (US); Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/069,789

(22) Filed: Mar. 14, 2016

Related U.S. Application Data

(63) Continuation of application No. 14/574,040, filed on Dec. 17, 2014, now Pat. No. 9,305,283.

(51) Int. Cl.
*G06K 19/06* (2006.01)
*G06Q 10/08* (2012.01)
*G06K 19/077* (2006.01)
*G06K 7/10* (2006.01)

(52) U.S. Cl.
CPC ....... *G06Q 10/087* (2013.01); *G06K 7/10237* (2013.01); *G06K 19/07703* (2013.01)

(58) Field of Classification Search
CPC .............. G06Q 10/087; G06K 7/0004; G06K 7/10237; G06K 19/07703
USPC .................. 235/375, 385, 487, 492, 494
See application file for complete search history.

(56) References Cited

U.S. PATENT DOCUMENTS

| | | | | |
|---|---|---|---|---|
| 7,762,460 B2* | 7/2010 | Higuchi | ............... | G06K 7/0004 235/440 |
| 8,505,817 B2* | 8/2013 | Iizaka | ................... | G06Q 30/02 235/383 |
| 8,919,648 B2* | 12/2014 | Man | ...................... | G06K 7/0004 235/435 |
| 2005/0178832 A1* | 8/2005 | Higuchi | ............... | G06K 7/0004 235/440 |
| 2012/0104087 A1* | 5/2012 | Iizaka | ................... | G06Q 30/02 235/375 |
| 2013/0054344 A1* | 2/2013 | Iizaka | .................. | G07G 1/0054 705/14.38 |
| 2014/0048593 A1* | 2/2014 | Hoganson | ........ | G06Q 10/06316 235/376 |
| 2014/0084064 A1* | 3/2014 | Man | ...................... | G06K 7/0004 235/440 |

OTHER PUBLICATIONS

U.S. Appl. No. 14/574,040, filed Dec. 17, 2014, Titled: Association of Item Identifiers.
U.S. Appl. No. 14/574,040 , "Notice of Allowance", dated Dec. 10, 2015, 10 pages.

* cited by examiner

*Primary Examiner* — Paultep Savusdiphol
(74) *Attorney, Agent, or Firm* — Kilpatrick Townsend & Stockton LLP

(57) ABSTRACT

A reader system and an imaging device are provided. The reader system is configured to read a tag attached to an item at a location relative to a barcode. The barcode is associated with the item. Once the reader system identifies the tag, the imaging device uses the placement of the tag and/or features of the tag to identify and read the barcode. The imaging device may also identify the tag. Once the barcode is identified, the barcode and the tag are associated.

20 Claims, 7 Drawing Sheets

US 9,818,083 B1

ASSOCIATION OF ITEM IDENTIFIERS

CROSS-REFERENCES TO RELATED APPLICATIONS

This application is a continuation of U.S. patent application Ser. No. 14/574,040, filed Dec. 17, 2014, issued as U.S. Pat. No. 9,305,283, entitled "ASSOCIATION OF ITEM IDENTIFIERS", which is incorporated herein by reference in its entirety.

BACKGROUND

Recent years have seen an increased interest in radio-frequency identification (RFID) technologies. For example, an inventory item in a business can be tracked using an RFID tag that is attached to the item. The RFID tag is a type of an item identifier. Reading the RFID tag may be performed without a clear line of sight between an RFID reader and the tag. This is because RFID tags are read using electrical signals transmitted wirelessly. A barcode is another type of item identifier and can also be used to track inventory items. A barcode may be printed on the inventory item or otherwise attached to the inventory item. To read the barcode, a barcode reader (e.g., an imaging device, a scanner, a camera, or other suitable device configured to read barcodes) scans the barcode by sweeping a light beam across the barcode, capturing an image of the barcode, or by using other similar methods. In any case, reading the barcode may require a clear line of sight between the barcode reader and the barcode.

BRIEF DESCRIPTION OF THE DRAWINGS

Various embodiments in accordance with the present disclosure will be described with reference to the drawings, in which.

DETAILED DESCRIPTION

Figure 1:
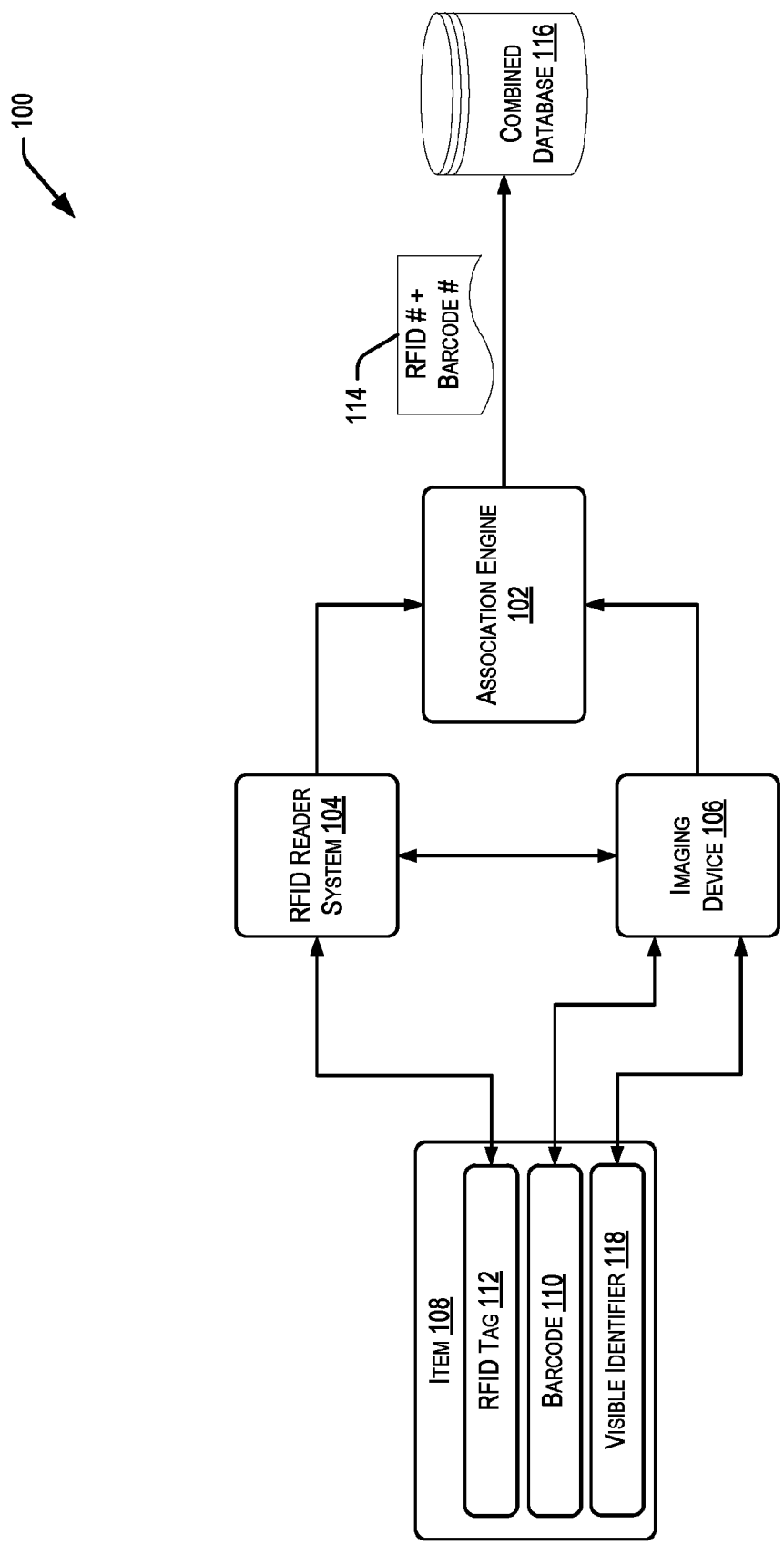
FIG. 1 is an example block diagram depicting techniques relating to associating item identifiers as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present specification are directed to, among other things, techniques for associating item identifiers. In particular, examples are directed to programmatically associating a barcode, which is read using light, with a radio-frequency identification (RFID) tag, which is read using wireless electrical signals. Because barcodes are generally ubiquitous, most consumer items are already associated with a barcode. The barcode may come printed on the consumer item or on packaging associated with the consumer item. The barcode can be used to track the item by scanning the barcode and identifying the item from the barcode information. It may also be desirable for a user to associate the barcode with an RFID tag. Such association may enable the purchaser to utilize services designed to track consumer items using RFID technology. For example, a purveyor of a convenience store may associate a unique RFID tag with each product on its shelves. The purveyor can then uniquely read all of the products on the shelves using an RFID reader without removing each product and scanning its particular barcode. Thus, association of barcodes with RFID tags may present efficiencies in managing inventory at a business level or within a home.

In a particular example, a user purchases breakfast cereal from a third party. The breakfast cereal is associated with a barcode which is printed on the side of the cereal box. The user then accesses an RFID tag. The RFID tag is identifiable by an RFID reader system. The RFID tag is also identifiable by an imaging device via a visible identifier of the RFID tag. The RFID tag is positioned relative to the barcode and configured to assist an imaging device to locate the barcode. When the RFID tag has been read by the reader, the reader, or a computing system with which the reader communicates, can initiate instructions to capture an image including the barcode, process the image captured including the barcode (e.g., rectify the image), read the barcode to identify the data associated with the barcode, and associate the barcode with the RFID tag. To aid in this function, in embodiments the RFID tag includes a transparent substrate in an interior portion that is surrounded by a perimeter including the visible identifier. The RFID tag is mounted over the top of the barcode such that the barcode is visible through the transparent substrate and the visible identifier surrounds the exterior of the barcode. When the cereal box, with the RFID tag, is moved into range of the RFID reader system, the RFID reader system reads the RFID tag. In response, the imaging device is initiated. The imaging device uses the visible identifier of the RFID tag to identify and focus on the barcode. The visible identifier may also be used by the imaging device to uniquely identify an RFID number associated with the RFID tag. Once the barcode is identified, the imaging device reads the barcode. Once read, an association of the barcode and the RFID tag is stored in a database.

Turning now to the figures, FIG. 1 illustrates a block diagram 100 for implementing techniques relating to associating item identifiers as described herein. The block diagram 100 may include an association engine 102. The association engine 102 may be in communication with an RFID reader system 104 and an imaging device 106. The association engine 102 is configured to manage the operation of the RFID reader system 104 and the imaging device 106 to implement the techniques described herein. The block diagram 100 may also include item 108. The item 108 may be any suitable item with which a barcode 110 and an RFID tag 112 may be associated. For example, the item 108 may be an example of consumer items, household items, grocery items, auto parts, electronics, sporting equipment, durable goods, inventory items in a business or warehouse, commercial items, or any other item that can be tagged for identification. The barcode 110 may be any suitable continuous or discrete one-dimensional or linear barcode (e.g., universal product code (UPC), Codabar, Code 25, Code 39, Code 128, EAN 2, EAN 5, Facing Identification Mark, Intelligent Mail Barcode, MSI, Pharmacode, PLANET, Plessey, and any other suitable one-dimensional barcode) or two-dimensional or matrix barcode (e.g., QR code, color-based code, Aztec code, and other suitable two-dimensional barcodes). The RFID tag 112 may be any suitable RFID tag as described herein. The RFID tag 112 may have a visible identifier 118. The visible identifier 118 may be visible to the imaging device 106. The visible identifier 118 may uniquely identify an RFID number associated with the RFID tag 112. With this in mind, the visible identifier 118 may include, for example, any suitable combination of one or more of the following: a shape, an edge, a corner, a pattern, an alphanumeric identifier (e.g., a hexadecimal number associated with the RFID tag 112), a symbol or a color that is associated with an RFID number associated with the RFID tag 112, and any other distinguishing feature or characteristic.

In a typical example, the item 108 may be associated with the barcode 110 prior to a user obtaining the item 108. For items that are mass produced, the barcode 110 may be the same for each unit of a particular item or type of item. Thus, in some examples, the barcode 110 may only identify the product type (e.g., a can of noodle soup), but not necessarily identify the particular can of noodle soup that is the item 108. Because the RFID tag 112 is entirely unique, associating it with the item 108 via the barcode 110 may enable improved tracking of the actual item 108.

When the item 108 is moved within the range of the RFID reader system 104, the RFID reader system 104 may read the RFID tag 112. The RFID reader system 104 may inform the imaging device 106 that it has read the RFID tag 112. In some examples, the RFID reader system 104 may inform the association engine 102 that it has read the RFID tag 112 by transferring tag data (e.g., an RFID number associated with the RFID tag 112) to the association engine 102. The association engine 102 may then initiate the imaging device 106. In either example, once the RFID tag 112 has been read, the imaging device 106 begins to scan for the visible identifier 118 of the RFID tag 112 and/or the barcode 110. The RFID tag 112, or the visible identifier 118 of the RFID tag 112, may have a unique shape or be placed adjacent to the barcode 110 in a particular manner. The information about the shape of the RFID tag 112 and/or placement of the RFID tag 112 relative to the barcode 110 may be shared with the imaging device 106. Thus, the imaging device 106 may use this information to scan for the visible identifier 118 of the RFID tag 112 and/or the barcode 110. For example, the imaging device 106 may initially search for the visible identifier 118 of the RFID tag 112 and, once identified, use the visible identifier 118 to focus on the barcode 110. The imaging device 106 may be configured to search for features of the RFID tag 112 that are true for all RFID tags or that are true for the particular RFID tag 112 that has been placed on the item 108. Features include, for example, edges, corners, shapes, colors, frames, and any other feature than can be used by the imaging device 106 to identify the RFID tag 112. In some examples, the imaging device 106 (or the association engine 102) may perform any suitable edge recognition technique to identify the edges of the RFID tag 112 and/or the edges of the visible identifier 118. Because the imaging device 106 may know how the RFID tag 112 should have been placed relative to the barcode 110, once one or more edges of the RFID tag 112 are identified, the imaging device 106 may search for the barcode 110 based on the relative location.

Once the imaging device 106 has identified the barcode 110, barcode data is passed to the association engine 102. The association engine 102 then associates the tag data from the RFID tag 112 with the barcode data from the barcode 110. This may include performing one or more operations to identify the barcode 110 in a database of possible barcodes (FIG. 2) or to verify the barcode 110. A mapping 114 of the RFID data and the barcode data is stored in a combined database 116. In some examples, the RFID data and the barcode data are independently passed to the combined database 116 and stored in association with each other.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader is received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer, is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

Figure 2:
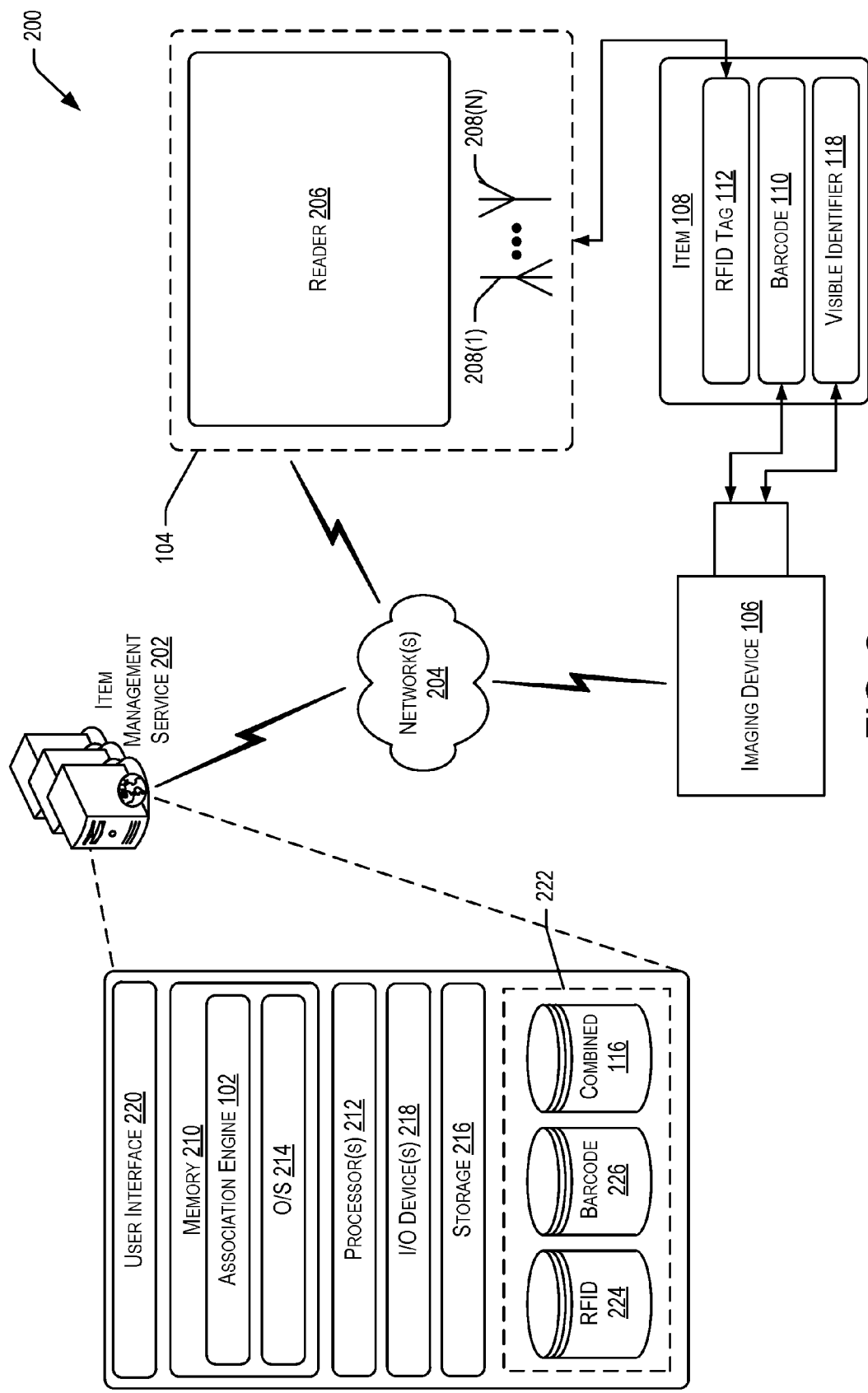
FIG. 2 is an example schematic architecture for implementing techniques relating to associating item identifiers as described herein, according to at least one example.

FIG. 2 illustrates an example architecture 200 for implementing techniques relating to associating item identifiers as described herein. The architecture 200 may include an item management service 202 in communication with the RFID reader system 104 and the imaging device 106 via one or more network(s) 204. The network 204 may include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

Turning first to the RFID reader system 104, the RFID reader system 104 may be configured to manage the reading of the RFID tags 112 attached to the items 108. To this end, the RFID reader system 104 may be any suitable radio-frequency (RF) reader system capable of reading RFID tags. In some examples, the RFID reader system 104 may be an active reader passive tag system. In other examples, the RFID reader system 104 may be a passive reader active tag system, an active reader active tag system, or any other suitable reader system and tag combination. The RFID reader system 104 may be configured to read tags using any suitable frequency band, including low frequency bands, high frequency bands, ultra-high frequency bands, microwave bands, and any other suitable frequency bands.

The RFID reader system 104 may include reader 206 and one or more antennas 208(1)-208(N). As introduced above, the reader 206 may be any suitable RFID reader and, in some examples, may include one or more computers, servers, chips, chipsets, or the like. Thus, the reader 206 may include processors and memory to implement reading techniques. The antennas 208 may be any suitable antennas configured to transmit and receive RF energy. In particular, the reader 206 may be configured to read the RFID tag 112 via one or more of the antennas 208. The RFID reader system 104 may be distributed throughout multiple locations, rooms, or positions. For example, the antennas 208 may be located in a first room where the item 108 is located, while the reader 206 may be located in a second room.

To read RFID tags (and identify corresponding items), the reader 206 may be configured to transmit, via the antennas 208, RF energy in the form of RF signals (e.g., an interrogation signal) and receive, via the antennas 208, RF energy in the form of RF signals (e.g., authentication replies) from the RFID tags. The reader 206 may transmit the interrogator signal to the antennas 208 which may direct the interrogation signal in the direction of the items 108. The interrogation signal may energize the RFID tags 112 attached to the corresponding items 108.

Once the RFID tag 112 is energized, it may begin to transmit its own RF energy (e.g., an authentication reply). As the reader 206 is configured to receive RF energy, it may receive the authentication reply from the RFID tag 112. The process of the reader 206 sending an interrogation signal and receiving authentication replies from the RFID tags 112 may be characterized as "reading tags."

The imaging device 106 may be any suitable imaging device capable of reading the barcode 110 and/or identifying the visible identifier 118 within an environment. For example, the imaging device 106 may include a light source and a photosensor that is scrubbed across the environment, a digital camera configured to capture imagery (e.g., one or more images) within the environment, a video camera configured to capture video (e.g., continuous image frames) within the environment, or any other suitable combination of a projector and a light sensor.

The item management service 202 may be configured to manage the operation of the RFID reader system 104, the imaging device 106, and any other aspects of associating item identifiers. The item management service 202 may be implemented as part of an electronic marketplace. In some examples, the electronic marketplace associates a portion of items that it sells with unique RFID tags. Thus, the barcodes for these items may already be associated with RFID tags and stored by the item management service 202. In some examples, the techniques described herein may be implemented with items obtained from third parties which do not typically use RFID-barcode associations. Associating the items purchased from third parties with RFID tags and storing such association with the item management service 202 may enable the user to manage all of its items using RFID. Thus, the item management service 202 becomes not only a service for managing the association of RFID tags with barcodes, but a service for managing inventory items (i.e., items that are stored or retained by the user). In some examples, all or a portion of the item management service 202 may be implemented on a local computer at the same location where the RFID reader system 104 and the imaging device 106 are located.

The tracking of items using the RFID tags 112 may provide the user with information about when to replace certain items, when certain items expire, when certain items should be serviced, when services associated with certain items should be paid for or renewed, and other similar types of information. For example, a pantry RFID reader system that is in communication with the item management service 202 may be provided in a pantry of a kitchen. After barcodes of grocery items (e.g., examples of the items 108) are associated with RFID tags as described herein and placed in the pantry, the pantry RFID reader system may continuously monitor the grocery items via the RFID tags. For example, after a particular grocery item is spent (e.g., flour) and disposed of, the pantry RFID reader system may no longer be able to read an RFID tag associated with the flour. Because the item management service 202 has access to the association between the RFID tag on the flour and the barcode on the flour, the item management service 202 may inform a user that flour should be purchased. In particular, the item management service 202 may inform the user the particular brand of flour and other information that is particular to the flour that was in the pantry. This information could be added to a shopping list or automatically fulfilled. The same type of monitoring may indicate that a different grocery item that has an expiration date (e.g., olive oil) has been in the pantry beyond the expiration date. Based on this information, the item management service 202 may inform the user that the olive oil should be disposed of and new olive oil purchased. The item management service 202 may recommend a different olive oil, whether or not the same olive oil was originally purchased from the electronic marketplace associated with the item management service 202.

The item management service 202 may include one or more service provider computers, perhaps arranged in a cluster of servers or as a server farm, and may host web service applications. These servers may be configured to host a website (or combination of websites) viewable on a user interface of a user device. The item management service 202 may include at least one memory 210 and one or more processing units (or processor(s)) 212. The processor 212 may be implemented as appropriate in hardware, computer-executable instructions, software, firmware, or combinations thereof. Computer-executable instruction, software or firmware implementations of the processor 212 may include computer-executable or machine-executable instructions written in any suitable programming language to perform the various functions described. The memory 210 may include more than one memory and may be distributed throughout the item management service 202, which may be hosted as one or more virtual computers. The memory 210 may store program instructions (e.g., the association engine 102) that are loadable and executable on the processor(s) 212, as well as data generated during the execution of these programs. Depending on the configuration and type of memory including the item management service 202, the memory 210 may be volatile (such as random access memory (RAM)) and/or non-volatile (such as read-only memory (ROM), flash memory, or other memory). The item management service 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 210 may include multiple different types of memory, such as static random access memory (SRAM), dynamic random access memory (DRAM), or ROM. The memory 210 may include an operating system 214. The item management service 202 may also include input/output (I/O) device(s) and/or ports 218, such as for enabling connection with a keyboard, a mouse, a pen, a voice input device, a touch input device, a display, speakers, a printer, or other I/O device.

In some examples, the item management service 202 may also include additional storage 216, which may include removable storage and/or non-removable storage. The additional storage 216 may include, but is not limited to, magnetic storage, optical disks, and/or tape storage. The disk drives and their associated computer-readable media may provide non-volatile storage of computer-readable instructions, data structures, program modules, and other data for the computing devices. The memory 210 and the additional storage 216, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the item management service 202. As discussed in more detail with reference to FIG. 3, the association engine 102 may include one or more components.

In some examples, the item management service 202 may also include a user interface 220. The user interface 220 may be utilized by an operator, or other authorized user to access portions of the item management service 202. In some examples, the user interface 220 may include a graphical user interface, web-based applications, programmatic interfaces such as application programming interfaces (APIs), or other user interface configurations. The item management service 202 may also include a data store 222. In some examples, the data store 222 may include one or more databases, data structures, or the like for storing and/or retaining information associated with the item management service 202. In this example, the data store 222 may include data structures, such as RFID number database 224, barcode database 226, and the combined database 116.

The RFID number database 224 may be used to retain information identifying possible RFID numbers which are associated with RFID tags, such as the RFID tag 112. For example, the RFID tags 112 that users attach to the items 108 may be provided to the users by an operator of the item management service 202. Alternatively, in some examples, the RFID tags 112 may be provided to the users independent of the item management service 202. In this example, the item management service 202 may save the RFID numbers associated with the RFID tags 112 in the RFID number database 224 once the RFID tags 112 are read.

The barcode database 226 may be used to retain information pertaining to barcodes, such as the barcode 110. For example, the barcode database 226 may include information associating barcodes with items. In some examples, more than one barcode is associated with one item. The barcode database 226 may track these associations and be accessed as part of implementing the techniques described herein. Images of the item 108 and other information (e.g., item details, expiration dates, renewal rates, service dates, and information characterizing the item 108) may also be retained in the barcode database 226 and associated with the barcode 110.

The combined database 116 may be used to retain information pertaining to associated item identifiers. For example, once the association engine 102 associates the barcode 110 with an RFID number of the RFID tag 112, the association engine 102 may retain the association in the combined database 116. The combined database 116 may include associations that are specific to a user, a group of users, an organization, or the like. Whether stored in their own specific location within the combined database 116, or accessible from a general location within the combined database 116, the associations may enable a particular user to track all of its inventory. In some examples, other information is retained in the combined database 116 in association with the RFID number and the barcode, such as, for example, images of the item 108, item information for the item 108, and purchase history of the item 108 by the user.

Figure 3:
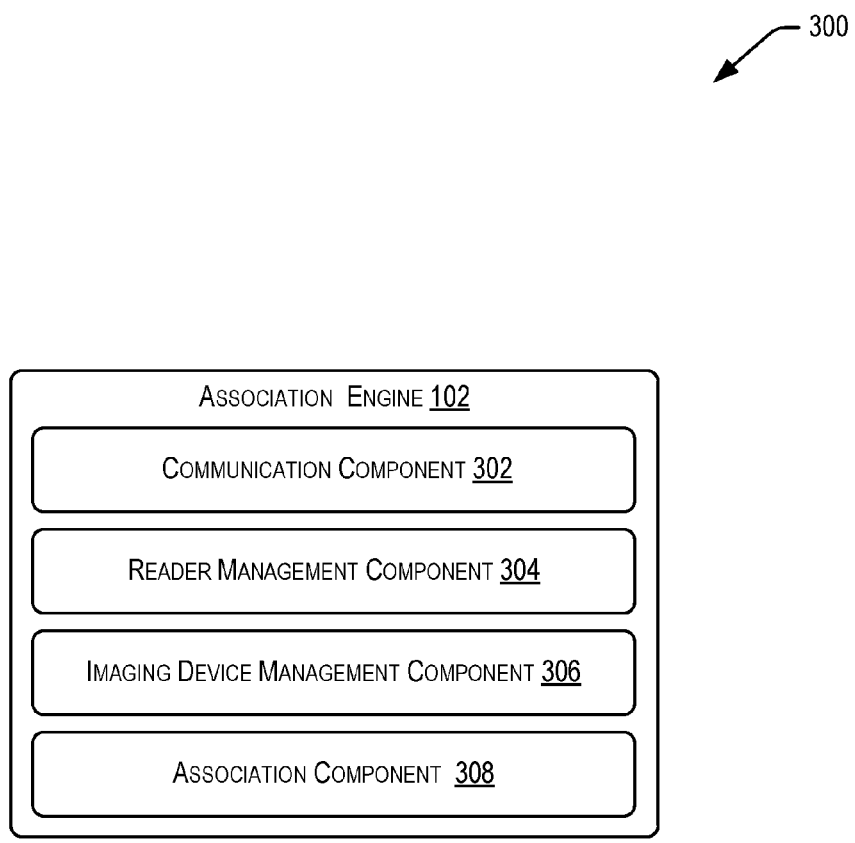
FIG. 3 is an example device for implementing techniques relating to associating item identifiers as described herein, according to at least one example.

FIG. 3 illustrates an example device 300 including association engine 102. The association engine 102 may be configured to manage one or more sub-modules, components, and/or services directed to examples disclosed herein. In some examples, the association engine 102 may include a communication component 302, a reader management component 304, an imaging device management component 306, and an association component 308. While these modules and components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules or engines may perform the same tasks as the association engine 102 or other tasks and may be implemented in a similar or different fashion.

Generally, the communication component 302 may be configured to manage communications between the various components of the architecture 200. For example, the communication component 302 may receive information from the RFID reader system 104 and pass it to other components of the association engine 102 to be processed. The reader management component 304 may be configured to manage the RFID reader system 104. For example, the reader management component 304 may adjust the intensity of the reading signals transmitted by the reader 206 via the antennas 208. The imaging device management component 306 may be configured to manage the operation of the imaging device 106. This may include, for example, scanning for a pattern of the RFID tag 112, the visible identifier 118 of the RFID tag 112, or the location of the RFID tag 112 relative to the barcode 110. This also may include capturing images or videos of the item 108. Finally, the association component 308 may be configured to manage the process of associating the barcode 110 with the RFID tag 112.

Figure 4:
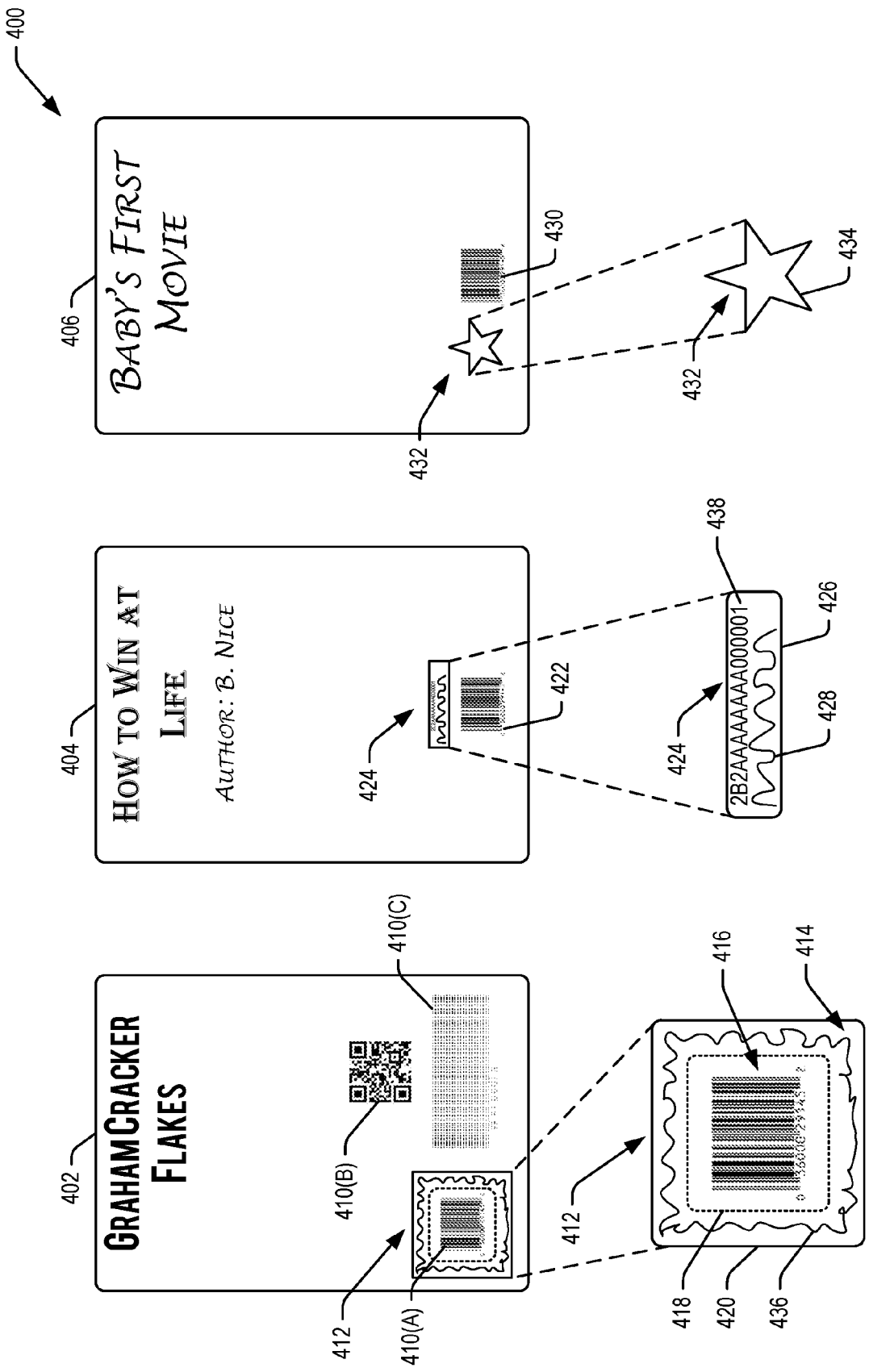
FIG. 4 is an example diagram depicting techniques relating to associating item identifiers as described herein, according to at least one example.

FIG. 4 illustrates an example diagram 400 for implementing techniques relating to associating item identifiers as described herein. The diagram 400 includes three items 402-406. Each of the items 402-406 is an example of the item 108. The item 402 is breakfast cereal. The item 404 is a book. The item 406 is a movie. The item 402 may include three barcodes, 410(A), 410(B), and 410(C). Each of the barcodes 410(A)-410(C) is illustrated as being a different type of barcode. For example, barcode 410(B) is a QR code, which is a type of a two-dimensional barcode. Barcode 410(A) is a UPC, which is a type of one-dimensional barcode. The barcode 410(A) is shown with an RFID tag 412 surrounding it. The RFID tag 412 is an example of the RFID tag 112. The RFID tag 412 has been placed by a user over the barcode 410(A) in a manner that can be used by the imaging device 106 to identify the barcode 410(A). In some examples, the RFID tag 412 partially overlies the barcode 410(A). In some examples, because the RFID tag 412 is placed over the barcode 410(A) (and not the other barcodes 410(B), 410(C)), the barcode 410(A) may be more easily identified using the techniques described herein. In some examples, all of the barcodes 410(A)-410(C) are read and the correct barcode of the set is associated with the RFID tag 412. In some examples, the other barcodes are also associated with the RFID tag 412.

The RFID tag 412 includes an interior portion 416 and an exterior portion 414. The interior portion is bounded by the dashed line 418. The interior portion 416 may be constructed of a material such that the imaging device 106 can read the barcode 410(A) via the material. For example, the material may have transparent or translucent properties (e.g., plastic, glass, and other material having transparent and/or translucent properties). Materials having transparent properties may allow light to pass through. Materials having translucent properties may allow some light to pass through. In some examples, the interior portion 416 is not included in the RFID tag 412. In this example, the barcode 410(A) may be read by the imaging device 106 without any material covering the barcode 410(A). In some examples, an RFID number may be printed on the RFID tag 412. In this example, the imaging device 106 may read the RFID number from the RFID tag 412 and read the barcode 410(A). The RFID number is an example of the visible identifier 118.

The exterior portion 414 of the RFID tag 412 may extend from the dashed line 418 to a perimeter edge 420 and may define a pattern or shape of the RFID tag 412. The exterior portion 414 may be constructed of any suitable number of materials having translucent, transparent, or opaque properties. For example, the exterior portion may be constructed of an opaque substrate with a transparent or translucent layer on top of the opaque substrate. Within or on top of the layer may be disposed an RFID antenna 436. Materials having opaque properties may allow little or no light to pass through. In some examples, the exterior portion 414 is designed such that the RFID reader system 104 can read the RFID tag 412 and the imaging device 106 can use a portion of the RFID tag 412 (e.g., the perimeter edge 420 or the RFID tag antenna 436 visible to the imaging device 106 within or on top of the exterior portion 414). The perimeter edge 420 is an example of the visible identifier 118. In some examples, the imaging device 106 identifies the location of the barcode 410(A) using the pattern of the exterior portion 414, and also rectifies an image including the barcode 410(A) using the pattern of the exterior portion 414. In some examples, the RFID tag antenna 436 has a unique pattern or shape that the imaging device 106 can use to implement the techniques described herein. The RFID tag antenna 436 is an example of the visible identifier 118.

The item 404 may include a barcode 422 and an RFID tag 424. The barcode 422 is an example of the barcode 110 and the RFID tag 424 is an example of the RFID tag 112. The RFID tag 424 is placed on the item 404 at a location relative to the barcode 422. In this example, the relative location is directly above the barcode 422. Other example locations include: to either side (e.g., right or left) or below. The RFID tag 424 (and any other RFID tags discussed herein) may be placed in accordance with an RFID tag placement instruction. The RFID tag placement instruction may be provided to the user who places the RFID tag 424. Based on this instruction, the techniques described herein may anticipate where to find the barcode 422 relative to the RFID tag 424. In some examples, an exterior edge 426 of the RFID tag 424 may be a pattern and may therefore be used to identify the RFID tag 424 and barcode 422 and rectify an image including the barcode 422. In some examples, an RFID tag antenna 428 may be visible on or through the RFID tag 424. The RFID tag antenna 428 may be constructed having a unique shape. The shape may be used for implementing the techniques described herein. Thus, the placement of the RFID tag 424 and/or a shape corresponding to the RFID tag 424 may be used to identify the barcode 422. In some examples, the RFID tag 424 may include an RFID number 438. In some examples, the RFID number 438 may be printed on the RFID tag 424 in a manner such that the imaging device 106 can read the RFID number 438. Such reading may be desirable to uniquely identify the RFID tag 424 when other RFID tags have also been read. In some examples, the RFID tag antenna 428, the exterior edge 426, and/or the RFID number 438 are examples of the visible identifier 118.

The item 406 may include a barcode 430 and an RFID tag 432. The barcode 430 is an example of the barcode 110 and the RFID tag 432 is an example of the RFID tag 112. The RFID tag 432 has been placed on the item 406 at a location relative to the barcode 430. Similar to the item 404, the barcode 430 may be identified using the RFID tag 432. In some examples, the RFID tag 432 includes a unique pattern. In this example, the unique pattern is represented by an exterior frame 434. The exterior frame 434 forms the shape of a star. In some examples, any other suitable shape may be used (e.g., geometric shapes, non-geometric shapes, or any other suitable variety of shapes). In some examples, the exterior frame 434 is an example of the visible identifier 118.

Figure 5:
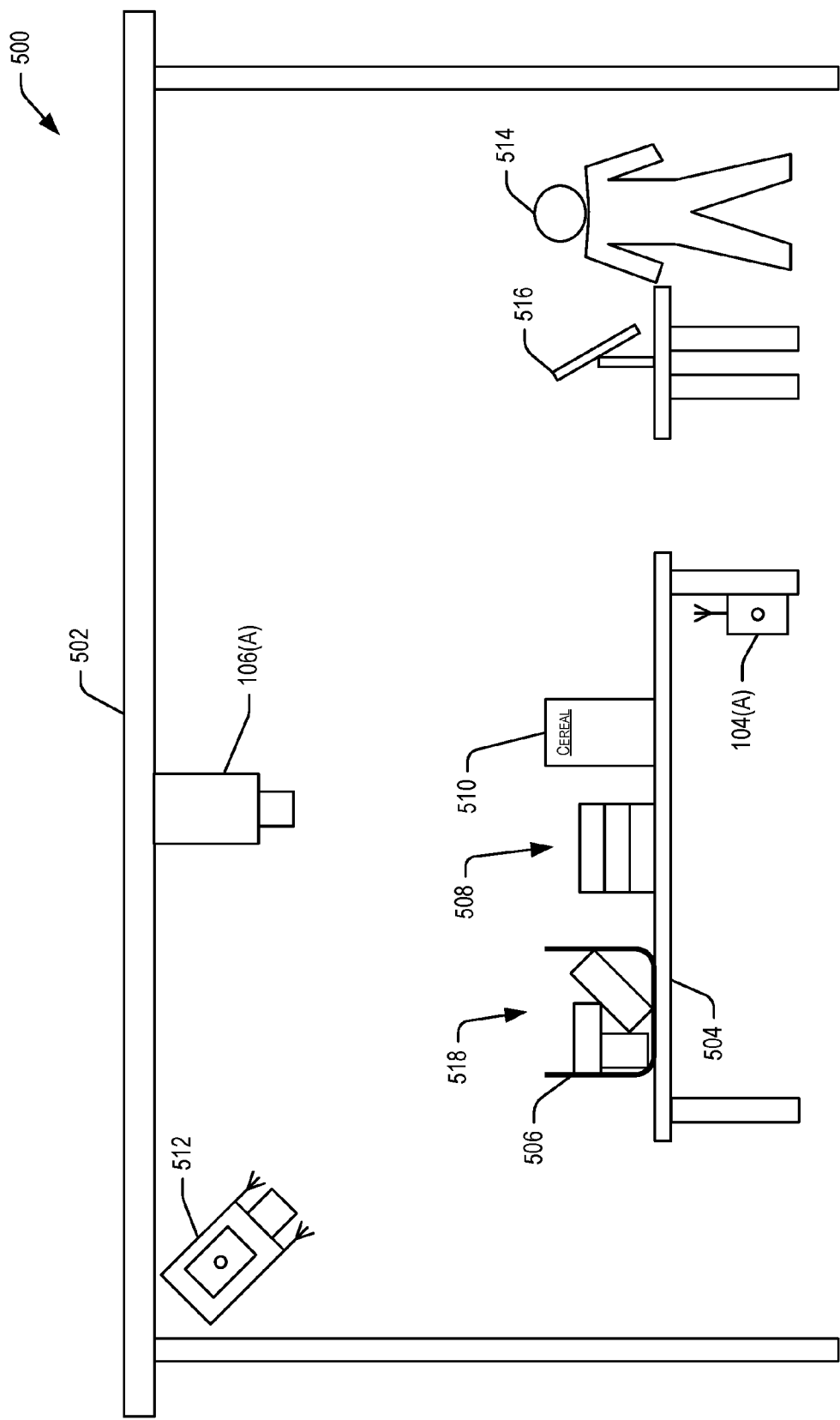
FIG. 5 is an example environment in which techniques relating to associating item identifiers may be implemented, according to at least one example.

FIG. 5 illustrates an example reading environment 500 in which techniques relating to associating item identifiers may be performed. The reading environment 500 may include a room 502. The room 502 may be an inventory room, a designated "reading room" for reading RFID tags and barcodes, a mixed-use room, or any other suitable combination. In some examples, items may move through the room 502 on a conveyor belt system, by human intervention, or using any other suitable method of movement. As illustrated, the room 502 may include a table 504. On the table may be situated a bin 506, a stack of items 508, and an item 510. The bin may include a variety of items 518. The items 518, the items in the stack of items 508, and the item 510 are examples of the item 108. As described herein, each of the items in the bin 506, the stack 508, and the item 510 may include a barcode and an RFID tag (not shown).

Within the room 502 is included an RFID reader system 104(A) and an imaging device 106(A). More than one RFID reader system, including more or fewer readers and/or antennas, may be included in the room 502 or outside of the room 502. Additionally, more than one imaging device may be included in the room 502 or outside the room 502. The RFID reader system 104(A) is shown attached to a leg of the table 504. This may enable the RFID reader system 104(A) to identify the RFID tags attached to the items on the table 504 once they are placed on the table 504. In some examples, the RFID reader system 104(A) may be mounted elsewhere. For example, it may be screwed into a light bulb socket or plugged into an outlet in the room 502. The imaging device 106(A) is positioned above the table 504. This may enable the imaging device 106(A) to image a wide portion of the room 502, including the table 504. In some examples, the imaging device 106(A) may be configured to move and/or rotate. In some examples, the imaging device 106(A) may be mounted elsewhere. For example, it may be screwed into a light bulb socket or plugged into an outlet in the room 502.

The room 502 also includes combined reader-imaging device 512. In some examples, the combined reader-imaging device 512 may be configured to perform the operations of the imaging device 106 and the RFID reader system 104. In some examples, the combined reader-imaging device 512 may be configured to move throughout the room 502 and/or may be mounted elsewhere. For example, the combined reader-imaging device 512 may be screwed into a light bulb socket or plugged into an outlet in the room 502. At least a portion of the data gathered by the RFID reader system 104(A), the imaging device 106(A), and/or the combined reader-imaging device 512 may be accessible by a user 514 via a user device 516. The user 514 may be associated with the room 502 and the items on the table 504. In some examples, the user device 516 is configured to implement at least a portion of the techniques described herein. The user device 516 is any suitable user device and may include, for example, personal computers, cell phones, handheld messaging devices, laptop computers, set-top boxes, personal data assistants, electronic book readers, or other user devices. In some examples, the techniques described herein are implemented by a service independent of the room 502 (e.g., the item management service 202).

Figure 6:
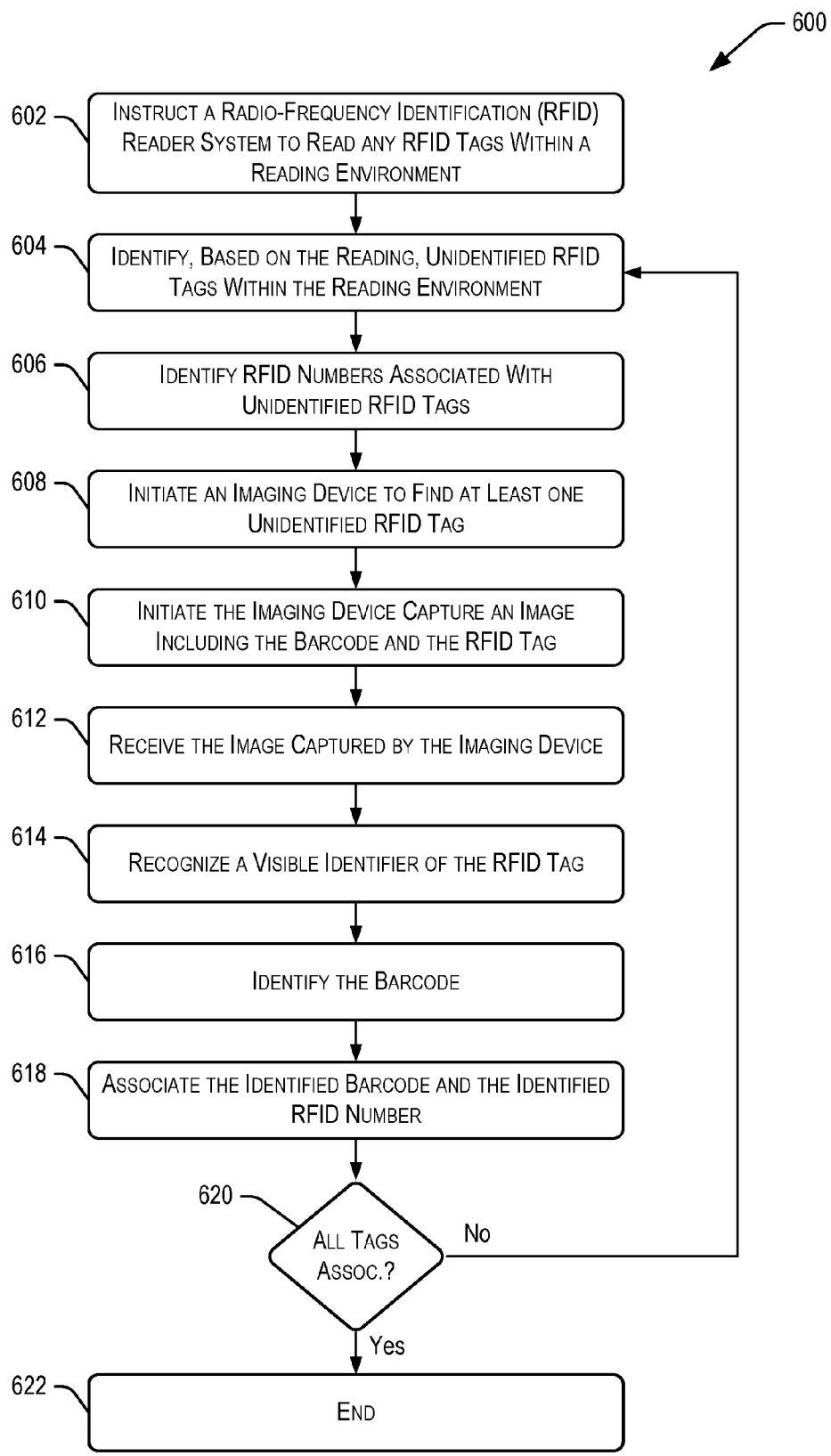
FIG. 6 is a flow diagram depicting example acts for implementing techniques relating to associating item identifiers as described herein, according to at least one example.

FIG. 6 depicts process 600 including example acts or techniques relating to associating item identifiers in accordance with at least one example. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The association engine 102 (FIG. 1) may perform the process 600 of FIG. 6. The process 600 begins at 602 by instructing a radio-frequency identification (RFID) reader system to read RFID tags within a reading environment. In some examples, this may be performed by the communication component 302 (FIG. 3). Instructing the RFID reader system to read may include instructing the RFID reader to read RFID tags by sending an interrogation signal in the direction of the items on which the RFID tags are attached. The reading environment may be a closed system where reading RFID tags and identifying barcodes and RFID tags takes place.

At 604, the process 600 identifies, based on the reading at 602, unidentified RFID tags within the reading environment. In some examples, this may be performed by the reader management component 304 (FIG. 3). Identifying the unidentified RFID tags may include determining which RFID tags have not been associated with barcodes, as opposed to other RFID tags which have already been associated with barcodes. In some examples, the RFID reader system reads continuously. In some examples, receiving signals from an unidentified RFID tag includes reading the unidentified RFID tag for the first time with the RFID reader system. For example, as a first item (with a first RFID tag) enters a reading environment, the first RFID tag may be an unidentified RFID tag because the RFID reader system has yet to recognize and identify the first RFID tag. Identifying the first RFID tag may therefore include identifying that the RFID tag is within the reading environment and/or within a range of the RFID reader system.

At 606, the process 600 identifies RFID numbers associated with unidentified RFID tags. In some examples, this may be performed by the reader management component 304. Identifying RFID numbers may be possible once the unidentified RFID tags are read. For example, an unidentified RFID tag may receive an interrogation signal and transmit an authenticated reply including its RFID number that can be processed to identify the RFID number associated with the unidentified RFID tag. In some examples, the RFID number is entirely unique to the unidentified RFID tag. In some examples, the reader has access to a list of possible RFID numbers and identifying the RFID number may include receiving an RFID number and comparing it to a list of possible RFID numbers to identify a match.

At 608, the process 600 initiates an imaging device to find at least one unidentified RFID tag. In some examples, this may be performed by the imaging device management component 306 (FIG. 3). Initiating the imaging device to find at least one unidentified RFID tag may include initiating the imaging device to search for a visible identifier associated with the unidentified RFID tag. The visible identifier may uniquely identify the unidentified RFID tag. For example, when there are multiple unidentified RFID tags in the reading environment, identifying each with the RFID reader system may not be sufficient to associate each with a barcode. This may be because the multiple unidentified RFID tags are attached to multiple items. In this example, it may be desirable to further identify the multiple unidentified RFID tags using the imaging device. Thus, at 608, the imaging device may be used to identify one or more visible identifiers of the multiple unidentified RFID tags to uniquely identify each. In this manner, a unique RFID number may be associated with each unidentified RFID tag. Alternatively, each unidentified RFID tag may include a unique visible identifier as described herein, and the association of each unique visible identifier with each unidentified RFID tag may be identified based on data within the RFID signal received from each RFID tag, or by reference to a database storing associations between visible identifiers and RFID tags, for example.

At 610, the process 600 initiates an imaging device to capture an image including a barcode and the RFID tag. In some examples, this may be performed by the imaging device management component 306 (FIG. 3). Initiating the imagine device may be in response to a reader identifying an RFID number associated with an identified RFID tag or an unidentified RFID tag. In some examples, initiating the imaging device may include turning the imaging device on and instructing the imaging device to begin to scan for visible identifiers of RFID tags and/or barcodes. In some examples, scanning may include scanning using projected light and a light sensor. In some examples, the scanning includes capturing video content or one or more images. In some examples, the imaging device is directed to a focused area that corresponds to the range of the antenna of the reader system that detected the RFID tag. Thus, it may be known that the barcode (attached adjacent to the RFID tag) is located within a certain distance of the antenna. In some examples, the imaging device scans for a predetermined amount of time or until some other threshold is met as discussed below. In some examples, the imaging device captures images that include one or more items each with an RFID tag and one or more barcodes on each of the one or more items. Using the imaging device, the techniques described herein may be used to distinguish between the one or more items and the one or more barcodes in order to associate at least one barcode with an RFID tag attached to a corresponding item.

At 612, the process 600 receives the image captured by the imaging device. In some examples, this may be performed by the communication component 302 (FIG. 3). Receiving the image captured by the imaging device may include receiving more than one image captured by the imaging device. In some examples, the image (or more than one image) may include the barcode, the RFID tag, and a portion of the item. In some examples, the RFID tag may be used by the imaging device to identify the barcode. As described herein, a visible identifier or indicator of the RFID tag (e.g., a frame, pattern, edge, color, shape, symbol or the like of the RFID tag) may be used by the imaging device to locate the RFID tag and focus the imaging device to find the barcode. The visible identifier or indicator may also be used to identify the RFID tag.

At 614, the process 600 recognizes a visible identifier of the RFID tag. In some examples, this may be performed by the association component 308 (FIG. 3). Recognizing the visible identifier may include processing one or more images, performing one or more image analysis techniques on the one or more images, selecting the image that has the best depiction of the barcode, and identifying the visible identifier of the RFID tag from the one or more images. In some examples, the image analysis techniques may include adjusting one or more characteristics of the image or a portion of the image. For example, the image analysis may include detecting edges of the visible identifier, aligning the visible identifier, rectifying the image such that the visible identifier is aligned, and any other suitable image analysis technique.

At 616, the process 600 identifies the barcode. In some examples, this may be performed by the association component 308. Identifying the barcode may include processing one or more images, performing one or more image analysis techniques on the one or more images, selecting the image that has the best depiction of the barcode, and reading the barcode from the image. In some examples, the image analysis techniques may include adjusting one or more characteristics of the image or a portion of the image. For example, the image analysis may include detecting edges, aligning the barcode, rectifying the image such that the barcode is aligned, and any other suitable image analysis technique. In some examples, identifying the barcode may include verifying the barcode. For example, the techniques described herein may verify that the identified barcode is indeed the correct barcode for the item. This may include comparing an image of the item with the barcode. The image may be the image of the item from which the barcode was extracted, or, in some examples, the image may be an image of the item from another source. These images, and other images, may be stored in association with the associated RFID number and barcode. In some examples, the barcode may already be stored in a database and identifying the barcode may include comparing the received barcode with others in the database.

At 618, the process 600 associates the identified barcode and the identified RFID number. In some examples, this may be performed by the association component 308. Associating the identified barcode and the identified RFID number may include storing the RFID number and the barcode in a database. In some examples, the associated RFID number and barcode may comprise a digital mapping of the RFID tag to the barcode. In some examples, associating the identified barcode may include associating more than one identified barcode with the RFID tag. In some examples, associating may include storing an association of the RFID number and at least one barcode in a database. In some examples, the RFID number may be associated with one or more images of the item and item information corresponding to the item.

At 620, the process 600 determines whether all RFID tags have been associated. In some examples, this determination is performed by the association component 308. Determining whether all RFID tags have been associated may include comparing a list of identified RFID numbers with a list of associated RFID numbers. If the list of identified RFID numbers is larger than the list of associated RFID numbers, the process may return to 604, where unidentified RFID tags are identified. Otherwise, the process ends at 622. In some examples, the decision at 620 is made based on a threshold. For example, if a threshold amount of time has passed since a start of the process 600, the answer at 620 may be yes, and the process 600 may end at 622. In some examples, the threshold indicates a threshold percentage of RFID numbers (from identified RFID numbers) that must be associated prior to concluding reading. In some examples, the percentage of RFID numbers that are associated with barcodes may increase over time. This may be a result of items within the reading environment moving, adjusting, or otherwise exposing different sides of the items to the imaging device to facilitate association of the RFID numbers and barcodes.

Figure 7:
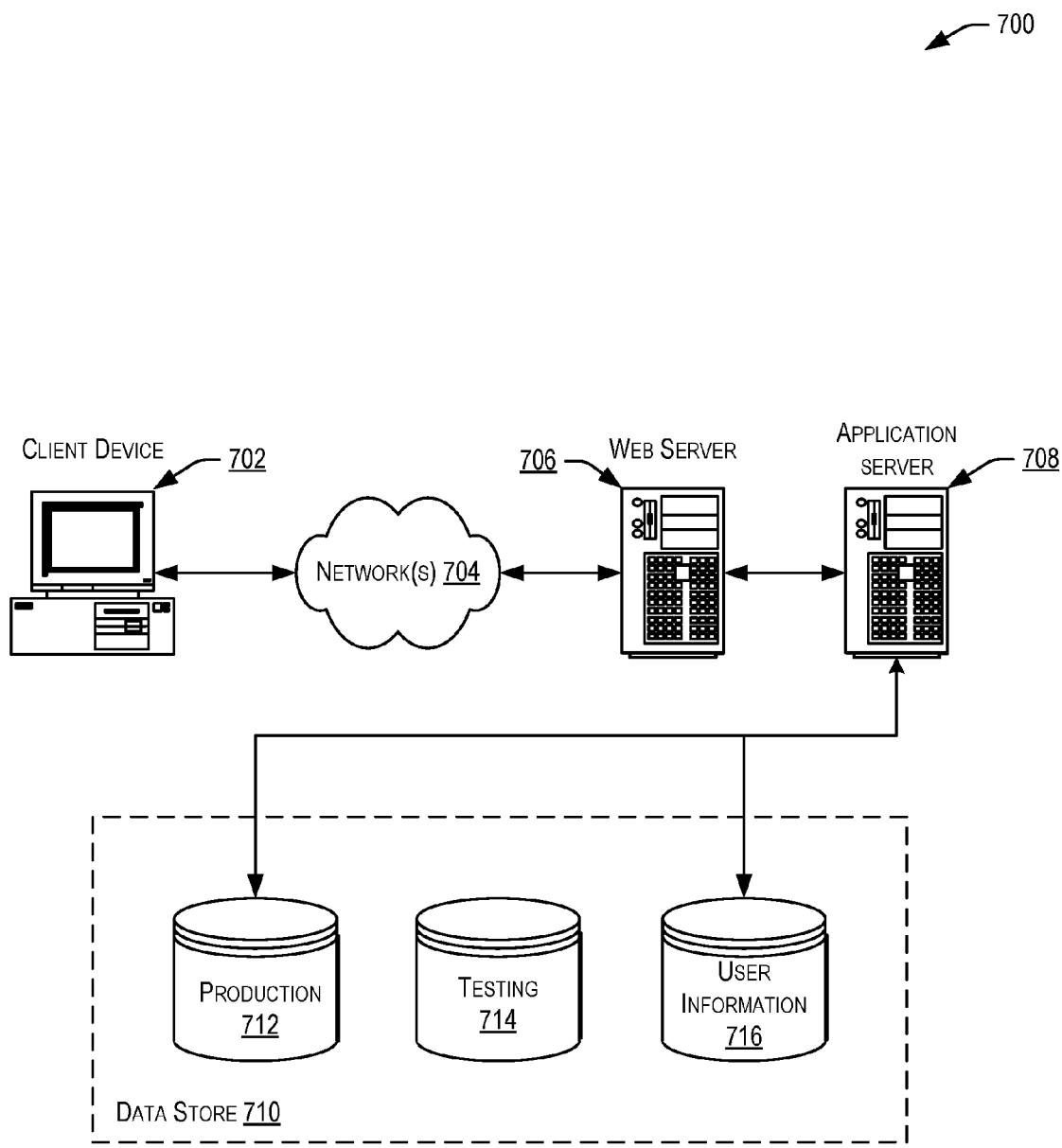
FIG. 7 is an example schematic environment for implementing techniques relating to associating item identifiers as described herein, according to at least one example.

FIG. 7 illustrates aspects of an example schematic environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any suitable device operable to send and receive requests, messages, or information over a suitable network 704 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for accessing requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more computer-readable storage devices for storing computer-executable instructions that, when executed by one or more computer systems, configure the one or more computer systems to perform operations comprising:

instructing a radio-frequency identification (RFID) reader system to read a tag comprising a visible identifier, the tag attached to an item at a position relative to an item identifier, the item identifier associated with the item, the visible identifier distinct from the item identifier;

identifying tag information associated with the tag based at least in part on the reading;

initiating an imaging device configured to capture at least one image of at least a portion of the item;

receiving the at least one image captured by the imaging device;

identifying the visible identifier of the tag in the at least one image captured by the imaging device;

identifying, based at least in part on information about the position of the tag in the at least one image, the item identifier associated with the item; and associating the item identifier and the tag.

2. The one or more computer-readable storage devices of claim 1, wherein the tag is a first tag, the tag information is first tag information, the visible identifier is a first visible identifier, the item identifier is a first item identifier, the item is a first item, and the position is a first position, and wherein the operations further comprise:

identifying second tag information associated with a second tag based at least in part on the reading, the second tag comprising a second visible identifier, the second tag attached to a second item at a second position relative to a second item identifier, the second item identifier associated with the second item;

identifying the second visible identifier of the second tag in the at least one image, the second visible identifier associated with the second tag information and being distinct from the first visible identifier;

identifying, based at least in part on information about the second position of the second tag in the at least one image, the second item identifier associated with the second item; and associating the second item identifier and the second tag.

3. The one or more computer-readable storage devices of claim 1, wherein the visible identifier comprises an antenna portion of the tag visible to the imaging device.

4. The one or more computer-readable storage devices of claim 1, wherein identifying the item identifier associated with the item comprises:

aligning, based at least in part on the identified visible identifier of the tag, the at least one image; and after aligning, reading the item identifier from the at least one image.

5. A computer-implemented method, comprising:

instructing a reader system to read a tag comprising a visible identifier, the tag attached to an item;

identifying a tag identifier associated with the tag based at least in part on the reading;

receiving at least one image including the item and captured by an imaging device;

identifying the visible identifier of the tag in the at least one image;

identifying, within or adjacent to the visible identifier of the tag in the at least one image, an item identifier associated with the item, the item identifier distinct from the visible identifier; and storing an association corresponding to the item identifier and the tag identifier.

6. The computer-implemented method of claim 5, wherein the tag comprises an interior portion and an exterior portion, and the tag is attached to the item such that the item identifier is located within the interior portion.

7. The computer-implemented method of claim 5, wherein the visible identifier comprises an antenna portion of the tag that is visible to the imaging device.

8. The computer-implemented method of claim 7, wherein the antenna portion of the tag comprises an antenna arranged in a unique pattern.

9. The computer-implemented method of claim 5, wherein the visible identifier comprises an alphanumeric tag number of the tag that is visible to the imaging device.

10. The computer-implemented method of claim 5, wherein the tag comprises an opaque perimeter including the visible identifier, and a translucent interior within the opaque perimeter, and wherein the tag is attached to the item such that the translucent interior is positioned over the item identifier and the item identifier is disposed within the opaque perimeter of the tag.

11. The computer-implemented method of claim 5, wherein the visible identifier comprises at least one of a shape, an edge, a corner, a pattern, an alphanumeric identifier, a symbol or a color that is associated with the tag identifier and is distinct from other visible identifiers of other tags.

12. The computer-implemented method of claim 5, wherein the item is a first item, the tag is a first tag, the visible identifier is a first visible identifier, the item identifier is a first item identifier, and the tag identifier is a first tag identifier, the method further comprising identifying a second tag identifier associated with a second tag attached to a second item, the second tag comprising a second visible identifier that is distinct from the first visible identifier, and wherein the at least one image includes at least the first visible identifier and the second visible identifier; and identifying the second visible identifier of the second tag in the at least one image.

13. The computer-implemented method of claim 5, wherein the imaging device captures the at least one image comprising the item identifier after the imaging device uses the visible identifier of the tag to identify a location of the item identifier within a reading environment.

14. The computer-implemented method of claim 5, further comprising:

after identifying the item identifier, identifying item information associated with the item; and providing at least a portion of the item information for presentation at a user device.

15. The computer-implemented method of claim 5, wherein the item identifier comprises a first barcode and a second barcode, and the at least one image includes the first barcode, the second barcode, and a portion of the item, each of the first barcode and the second barcode associated with the item, and wherein the method further comprises comparing the portion of the item represented in the at least one image with other images of items to determine which of the first barcode and the second barcode to associate with the tag identifier.

16. The computer-implemented method of claim 5, wherein the at least one image includes a depiction of the item, and wherein the association further comprises the visible identifier, the tag identifier, and the at least one image including the item.

17. The computer-implemented method of claim 5, wherein the at least one image includes a depiction of the item, and the method further comprises verifying the item identifier based at least in part on the depiction of the item in the at least one image.

18. A system, comprising:

an imaging device;

a reader system comprising a reader and an antenna; and an item management service in communication with at least the reader and the imaging device, the item management service comprising a processor configured to:

receive an indication that a tag has been read by the reader system, the tag having a visible identifier and being attached to an item;

in response to receiving the indication, instruct the imaging device to capture at least one image including the item;

receive the at least one image captured by the imaging device;

identify, within the at least one image, the visible identifier of the tag;

identify at least one item identifier associated with the item based at least in part on the visible identifier, the at least one item identifier distinct from the visible identifier; and store an association of the at least one item identifier and a tag identifier identifying the tag in a database.

19. The system of claim 18, wherein the tag comprises an opaque perimeter including the visible identifier, and a translucent interior within the opaque perimeter, and wherein the tag is attached to the item such that the translucent interior is positioned over the at least one item identifier and the at least one item identifier is disposed within the visible identifier of the opaque perimeter of the tag.

20. The system of claim 19, wherein the visible identifier comprises an antenna portion of the tag that is visible to the imaging device on the opaque perimeter.

* * * * *